United States Patent [19]

Krumwiede et al.

[11] Patent Number: 5,593,929
[45] Date of Patent: Jan. 14, 1997

[54] ULTRAVIOLET ABSORBING GREEN TINTED GLASS

[75] Inventors: John F. Krumwiede, Cheswick; Joseph A. Gulotta, New Kensington; Larry J. Shelestak, Bairdford, all of Pa.

[73] Assignee: PPG Industries, Inc., Pittsburgh, Pa.

[21] Appl. No.: 976,059

[22] Filed: Nov. 13, 1992

Related U.S. Application Data

[63] Continuation-in-part of Ser. No. 857,903, Mar. 26, 1992, Pat. No. 5,385,872, which is a continuation-in-part of Ser. No. 559,915, Jul. 30, 1990, Pat. No. 5,240,886.

[51] Int. Cl.$^6$ .............................. C03C 3/087; C03B 5/16
[52] U.S. Cl. .......................... 501/70; 65/134.1; 65/134.3
[58] Field of Search ................................. 501/69, 70, 71, 501/68; 65/134, 135, 134.3, 134.1

[56] References Cited

U.S. PATENT DOCUMENTS

| | | | |
|---|---|---|---|
| 1,936,231 | 11/1933 | Gelstharp et al. | 106/36.1 |
| 2,444,976 | 7/1948 | Brown | 20/56.5 |
| 2,524,719 | 10/1950 | Tillyer | 106/52 |
| 2,755,212 | 7/1956 | Brown | 154/2.77 |
| 2,860,059 | 11/1958 | Molter et al. | 106/52 |
| 3,294,556 | 12/1966 | Harrington | 106/52 |
| 3,779,733 | 12/1973 | Janakirama-Rao | 65/32 |
| 4,270,945 | 6/1981 | Amrhein et al. | 65/99 |
| 4,701,425 | 10/1987 | Baker et al. | 501/70 |
| 4,713,359 | 12/1987 | Lubelski et al. | 501/63 |
| 4,738,938 | 4/1988 | Kunkle et al. | 501/72 |
| 4,792,536 | 12/1988 | Pecoraro et al. | 501/70 |
| 5,013,487 | 5/1991 | Cheng | 252/587 |
| 5,077,133 | 12/1991 | Cheng | 428/426 |
| 5,214,008 | 5/1993 | Beckwith et al. | 501/69 |
| 5,320,986 | 6/1994 | Taniguchi et al. | 501/70 |
| 5,362,689 | 11/1994 | Morimoto et al. | 501/72 |
| 5,418,025 | 5/1995 | Harmand et al. | 428/38 |
| 5,478,783 | 12/1995 | Higby et al. | 501/71 |
| 5,523,263 | 6/1996 | Penrod | 501/70 |

FOREIGN PATENT DOCUMENTS

| | | |
|---|---|---|
| 596334 | 1/1990 | Australia . |
| 0488110A1 | 6/1992 | European Pat. Off. . |
| 734152 | 5/1980 | U.S.S.R. . |
| 948912 | 8/1982 | U.S.S.R. . |
| WO91/07356 | 5/1991 | WIPO . |
| WO91/11402 | 8/1991 | WIPO . |

OTHER PUBLICATIONS

"Titanium Dioxide, Its Effect on the Transmission of Various Glasses", J. H. Strimple, The Glass Industry, Apr. 1964, pp. 193–196.

"Effects of Titanium Dioxide in Glass", M. D. Beals, The Glass Industry, Sep. 1963, pp. 495–531.

Glass Colors, V: Examples of the Composition of Colored Glasses, Jiri Kocik, Jiri Nebrensky and Ivan Fanderlik, Fachberichte, Sprechsaal, vol. 121, No. 1, 1988, 42–44 (No Month).

*Glass Science and Technology 7*, "Chemical Approach to Glass", (1984) by Milos B. Volf, pp. 348 to 351 (No Month).

*Glass and Science Technology*, vol. 2, "Color Generation and Control in Glass", §2.1.1 Iron Optical Absorption in Soda–Lime–Silica Glass, pp. 34–38 (1977) (No Month).

*Journal of Soc. Glass Techn.*, "The Equilibrium between Ferrous and Ferric Oxides in Glasses", by Densem and Turner, 1937, pp. 372–389 (No Month).

*Glass, Science and Technology*, vol. 2, "Color Generation and Control Glass", §9.10 Color in Flat Glass, pp. 142–146 (No Date).

*J. Soc. Glass Technology*, "The Color of Iron–Containing Glasses of Varying Compositions", 1950, pp. 332–406 (No Month).

Letter to Donald C. Lepiane from Ford Motor Company, dated Aug. 2, 1994.

Letter to Donald C. Lepiane from Ford Motor Company, dated Aug. 5, 1994.

Ford Purchase Order No. G 26 SP89 100843 (Attachment A) (No Date).

Purchase Order dated Feb. 13, 1989 (Attachment B).

Composition of 1988 SGV Glass, dated Jan. 22, 1990 (Attachment C).

Report re Light Transmittance Properties of the SGV Glass (Attachment D) (No Date).

Ford Motor Company Purchase Order No. 463708 (Attachment E) (No Date).

Invoice from Ernie's Auto Parts to Ford Motor Company (Attachment F) (No Month).

Copy of Sekurit Identifying Information Etched in Lower Corner of Glass (Attachments G and G1) (No Month).

Ford File Report based on VIN numbers (Attachment H) (No Month).

XRF Chemical Analysis (Attachment I) (No Date).

Optical Analysis Report (Attachment J) (No Date).

*Primary Examiner*—Mark L. Bell
*Assistant Examiner*—David Sample
*Attorney, Agent, or Firm*—Andrew C. Siminerio

[57] ABSTRACT

A green tinted, ultraviolet absorbing glass is disclosed having a standard soda-lime-silica base glass composition and a colorant portion consisting essentially of on a weight basis: less than 2.0% $TiO_2$ and greater than 0.6% total iron (expressed as $Fe_2O_3$) with the ratio of FeO/total iron less than 0.35. The glass exhibits an ultraviolet transmittance no greater than 38 percent (300 to 400 nanometers) and a luminous transmittance (illuminant A) of at least 70 percent at thicknesses ranging from 0.154 to 0.189 inches.

109 Claims, No Drawings

ULTRAVIOLET ABSORBING GREEN TINTED GLASS

This application is a continuation-in-part application of U.S. Ser. No. 07/857,903, filed Mar. 26, 1992, now U.S. Pat. No. 5,385,872, which is a continuation-in-part of U.S. Ser. No. 07/559,915, filed Jul. 30, 1990, now U.S. Pat. No. 5,240,886.

BACKGROUND OF THE INVENTION

This invention relates to soda-lime-silica glass particularly suitable for controlling transmittance of solar radiation in window glazing applications. The glass may be generally described as being green tinted, and is designed to have low heat transmittance and particularly enhanced absorption in the ultraviolet wavelength range. This is desirable for the sake of reducing the rate at which the sun's rays deteriorate plastics and fabrics in applications such as automobiles. A particular objective of the invention is to permit glass of this type to be made at a lower cost by reducing the amount of costly ingredients required.

Soda-lime-silica flat glass may be essentially characterized by the following composition on a weight percentage basis of the total glass:

| | |
|---|---|
| $SiO_2$ | 66–75% |
| $Na_2O$ | 10–20 |
| CaO | 5–15 |
| MgO | 0–5 |
| $Al_2O_3$ | 0–5 |
| $K_2O$ | 0–5 |

Other minor ingredients, including melting and refining aids such as $SO_3$, may also appear in the glass composition. Small amounts of $K_2O$, BaO or $B_2O_3$ and other minor constituents have also sometimes been included in flat glass and may be considered optional. To this base glass are added the coloring constituents that produce the transmittance properties of the glass. The primary colorant in the category of glasses relevant to the present invention is iron, which is usually present in both the $Fe_2O_3$ and FeO forms. As is conventional, the total amount of iron present in a glass is expressed herein as $Fe_2O_3$, regardless of the form actually present. A typical green tinted automotive glass has about 0.5 percent by weight total iron, with the ratio of FeO to total iron being about 0.25.

Recently, it has become important to maximize the solar performance of automotive glazing. The use of larger glass areas and the elimination of CFC air conditioning coolants places a greater burden on the car interior and air conditioning systems. A goal has been established to limit ultraviolet transmittance to no more than 38 percent in some automotive glass. At the same time, it is a requirement that glass in vision areas of automobiles have an luminious transmittance of at least 70 percent.

Two approaches have been followed to improve the solar performance of the glass and meet these goals. In the first approach, high iron levels are used in the glass. The colorant composition and transmittance properties for examples of two commercial annealed products of this high iron, dark green tinted type along with an example of the conventional, light green tinted glass described above are set forth below:

| | Light Green Example A | Dark Green Example B | Dark Green Example C |
|---|---|---|---|
| Total Iron (wt. %) | 0.521 | 0.803 | 0.728 |
| FeO/Tot. Iron | 0.268 | 0.284 | 0.291 |
| $LT_A$ (%) | 80.45 | 71.1 | 72.44 |
| TSUV (%) | 54.82 | 38.8 | 42.28 |
| TSIR (%) | 37.38 | 22.4 | 24.62 |
| TSET (%) | 57.85 | 44.5 | 46.92 |

Although Examples B and C show a reduction in ultraviolet transmittance, the percentage still exceeds the desired goal. Merely increasing the amount of total iron to reduce the ultraviolet transmittance is not desirable because it would impermissibly lower the luminous (visible light) transmittance. Furthermore, the use of very high levels of iron can create problems in manufacturing the glass, such as shorter campaigns or the use of expensive electric boosting.

The second approach uses cerium oxide or cerium oxide plus titanium oxide in glass to reduce ultraviolet transmittance as disclosed in U.S. Pat. Nos. 2,860,059 and 5,077,133, and the following example is of a commercial product that takes this latter approach:

| | Example D |
|---|---|
| $CeO_2$ (wt. %) | 0.60 |
| $TiO_2$ (wt. %) | 0.22 |
| Total Iron (wt. %) | 0.783 |
| FeO/Tot. Iron | 0.266 |
| $LT_A$ (%) | 72.5 |
| TSUV (%) | 31.8 |
| TSIR (%) | 23.7 |
| TSET (%) | 45.7 |

This glass exhibits the desired combination of low ultraviolet transmittance and high luminous transmittance, but the high cost of cerium sources substantially increases the cost of making this glass. It would be desirable if these objectives could be met without incurring such high raw material costs.

It has also been found that glasses made according to these two approaches darkens upon tempering and exposure to solar ultraviolet radiation. This in turn lowers luminious transmittance. It is therefore necessary to reduce the heat absorbing component ($Fe_2O_3$) to ensure the glass has at least a 70% luminous transmittance after use.

For these reasons, it would be desirable to produce glasses with enhanced spectral properties but at lower cost and with reduced solarization.

The transmittance data provided above and throughout this disclosure, except where noted, is based on a glass thickness of 3.9 millimeters (0.154 inch). Luminous transmittance ($LT_A$) is measured using C.I.E. standard illuminant "A" over the wavelength range 380 to 770 nanometers at 10 nanometer intervals. Total solar ultraviolet transmittance (TSUV) is measured over the wavelength range 300 to 400 nanometers at 10 nanometer intervals. Total solar infrared transmittance (TSIR) is measured over the wavelength range 800 to 2100 nanometers at 50 nanometer intervals. Total solar energy transmittance (TSET) represents a computed value based on measured transmittances from 300 to 2100 nanometers at 50 nanometer intervals.

To determine this transmittance data, the transmittance values are integrated over the wavelength range [a,b]. This range is divided into n equal subintervals of length h by points $\{X_o, X_1, \ldots, X_n\}$ where $X_i = a + (i \times h)$. Generally, either the Rectangular Rule or the Trapezoidal Rule is used to compute the transmittance data. For each method, a different interpolating function is used to approximate the integrand $f$ in each subinterval. The sum of integrals of these interpolating functions provides an approximation of the integral:

$$I = \int_a^b f(X)dX$$

In the case of the Rectangular Rule, the constant value $f(X_i)$ is used as an approximation of $f(X)$ on $[X_{i-1}, X_i]$. This yields a step-function approximation of $f(X)$ on $[a,b]$, and the numerical integration formula:

$$I = \sum_{i=1}^{n} f(X_i) \times h$$

For the Trapezoidal Rule, $f(X)$ is approximated on $[X_{i-1}, X_i]$ by a straight line passing through the graph of $f$ at the end points. Thus, the interpolating function for $f(X)$ is piecewise linear on $[a,b]$ and the integration formula becomes:

$$I = \left[ f(X_o) + 2 \sum_{i=1}^{n-1} f(X_i) + f(X_n) \right] \times (h/2)$$

The transmittance data presented throughout this disclosure is based on the Trapezoidal Rule.

SUMMARY OF THE INVENTION

The present invention provides a green tinted, ultraviolet absorbing, soda line silica glass that has luminous transmittance of at least 70 percent and ultraviolet transmittance of no more than 38 percent at thicknesses ranging from 0.154 to 0.189 inches (3.9 to 4.9 mm). These properties are achieved in the present invention by using a colorant that is less than 2.0 percent by weight $TiO_2$ of the total glass composition, preferably 0.05 to 0.60 weight percent $TiO_2$, greater than 0.60 percent by weight total iron (expressed as $Fe_2O_3$), preferably 0.6 to 0.95 weight percent total iron, and a ratio of FeO/total iron (ferrous iron expressed as FeO divided by the total iron expressed as $Fe_2O_3$) of less than 0.350, preferably 0.24 to 0.29. The combination of iron and titanium oxide can actually increase the luminious transmittance, thereby allowing the maximum level of heat absorbing agent to be used and improve the overall solar performance of the glass.

The present invention also provides a method of producing green tinted, ultraviolet absorbing glass exhibiting ultraviolet transmittance no greater than 38 percent (300 to 400 nanometers) and luminous transmittance (illuminant A) of at least 70 percent at thicknesses ranging from 0.154 to 0.189. The method includes the steps of melting and forming soda lime silica glass having a colorant portion consisting essentially of, on a weight percent basis, less than 2.0% $TiO_2$, preferably 0.05 to 0.60 weight percent $TiO_2$, and greater than 0.6% iron (expressed as $Fe_2O_3$), preferably 0.6 to 0.95 weight percent total iron, and a ratio of FeO/total iron(ferrous iron expressed as FeO divided by the total iron expressed as $Fe_2O_3$) of less than 0.350, preferably 0.24 to 0.29, and tempering the glass to increase its luminous transmittance to a value greater than 70 percent.

DETAILED DESCRIPTION

The base glass composition is not critical to the present invention and may consist of any conventional soda-lime-silica flat glass composition, which may be characterized by the ranges set forth above. Preferably, the base glass is one known by those of skill in the art to be producible in a continuous melting furnace and formed into a flat sheet by the float process. A specific example of a base glass of the present invention can be seen in the following example which is example A discussed earlier.

| Base Glass Example A Composition | | |
|---|---|---|
| $SiO_2$ | 72.67 | percent by weight |
| $Na_2O$ | 13.76 | |
| CaO | 8.71 | |
| MgO | 3.84 | |
| $Al_2O_3$ | 0.14 | |
| $K_2O$ | 0.05 | |
| $SO_3$ | 0.214 | |
| $Fe_2O_3$ (total) | 0.521 | |

Additionally, traces of impurities may be present without significant effect on the glass. Melting and fining aids such as $SO_3$ are useful during production of the glass, but their residual amounts in the glass can vary and have no significant effect on the properties of the glass product. $K_2O$ is present in this example as an impurity, and its presence is not required, although it serves a function in the glass essentially equivalent to that of $Na_2O$. The batch mixture of raw materials from which the glass of Example 1 was melted was as follows:

| Sand | 1000 parts by weight |
|---|---|
| Soda ash | 329 |
| Limestone | 71 |
| Dolomite | 242 |
| Gypsum | 19.65 |
| Rouge | 6.4 |

It is important to control the ratio of ferrous to total iron in order to get the required spectral properties. One of the ways to control this ratio of ferrous to total iron is by selecting an amount of coal or other reducing agent to be included in the batch mixture. Instead of coal, various other sources of carbon are known to serve as reducing agents during melting of glass. Another means of control is by way of the ratio of air to fuel in the melting furnace. A higher air to fuel ratio produces conditions in the melting furnace that are more oxidizing, which, in turn, leads to a lower ferrous to total iron ratio. Specifying the oxidizing control measures depends upon the particular operating characteristics of a particular melting furnace. In some cases, as with the base glass in Example A, it may be desirable to include no coal or other reducing agent in order to attain the proper glass redox conditions required for the present invention.

It has been found that the spectral characteristics of soda lime silica glass change as a result of its subsequent use and processing. More specifically, the glass tends to darken upon exposure to ultraviolet radiation, which in turn lowers $LT_A$, TSUV and TSET. This effect, referred to as solarization, is particularly significant in high iron ($FE_2O_3 > 0.6$ wt. %) and cerium containing glass. In addition, it has been found that tempering also changes the glass's spectral characteristics. As used herein, tempering means heating the glass to above its annealing point temperature, typically about 1000° to 1040° F. (530° to 560° C.) for soda lime silica glass, and quickly cooling it to rapidly drop the glass temperature through the annealing range to the glass annealing point temperature, which is typically about 925° to 970° F. (496° to 521° C.). This operation induces compressive stresses in the outer layers of the glass and tensile stresses in the center.

Referring to Table 1, Examples 1 through 3 are modifications of the base glass described in Example A which illustrates the benefits of using titanium oxide in the glass batch to lower ultraviolet transmittance as well as improve luminous transmittance. Table 1 illustrates the base glass modifications and the average spectral properties of the annealed glass based on six samples for each composition. Table 2 shows the change in the percentages of the spectral properties of Examples 1, 2 and 3 due to solarization and tempering. The results for Examples 1 and 2 are based on actual production glass while Example 3 results are based on laboratory melts.

TABLE 1

(0.154 inch reference thickness)

| | Example 1 | Example 2 | Example 3 |
|---|---|---|---|
| $Fe_2O_3$ (wt. %) | 0.917 | 0.523 | 0.824 |
| Redox | 0.262 | 0.268 | 0.267 |
| $TiO_2$ | 0.017 | 0.325 | 0.40 |
| $LT_A$ (%) | 70.3 | 79.6 | 71.3 |
| TSUV (%) | 37.0 | 48.3 | 36.6 |
| TSIR (%) | 19.8 | 37.9 | 21.7 |
| TSET (%) | 42.7 | 57.2 | 43.7 |

TABLE 2

(change in spectral property percentage)

| | $LT_A$ | TSUV | TSIR | TSET |
|---|---|---|---|---|
| Example 1 | | | | |
| Tempering | −0.4 | −2.2 | 0 | −0.3 |
| Solarization | −0.7 | −0.8 | 0.4 | −0.2 |
| Total | −1.1% | −3.0% | 0.4% | −0.5% |
| Example 2 | | | | |
| Tempering | −0.2 | −1.5 | 0.2 | 0 |
| Solarization | −0.4 | −0.8 | 0.5 | 0.1 |
| Total | −0.6% | −2.3% | 0.7% | 0.1% |
| Example 3 | | | | |
| Tempering | 0.6 | −3.4 | 0.4 | 0.6 |
| Solarization | −0.4 | −0.5 | 0.5 | 0 |
| Total | 0.2% | −3.9% | 0.9% | 0.6% |

Referring to Table 1, although all three examples include $TiO_2$, the 0.017 wt. % amount in Example 1 is merely a trace amount of titanium oxide resulting from impurities in the glass batch materials. With respect to Examples 2 and 3, it can be seen that the addition of titanium oxide to both a typical soda lime silica glass (Example 2) and a high iron glass (Example 3) reduces the ultraviolet transmittance by 12% and 33%, respectively when compared to the base glass composition (Example A). From this it is clear that titanium oxide or titanium oxide with additional iron ($Fe_2O_3$) at levels disclosed herein may be used as an ultraviolet radiation absorber to reduce ultraviolet transmittance without the need of other additives.

Referring to Table 2, of particular significance is the effect the titanium oxide has an $LT_A$ after solarization and tempering. In Example 1, the $LT_A$ dropped a total amount of 1.1%. This means it would be expected that the $LT_A$ of 70.3% for the annealed glass would eventually drop to about 69.2% after tempering and exposure to ultraviolet radiation. It is noted that this $LT_A$ value is below the 70% level required under federal law. In Example 2, the $LT_A$ dropped 0.6% which is about half of the drop found in Example 1. In Example 3, the $LT_A$ is actually increased 0.2%.

In comparing the individual effects of solarization and tempering on $LT_A$, solarization reduced the $LT_A$ in Example 1 by 0.7% while the reduction in Examples 2 and 3 was only 0.4%. Tempering reduced the $LT_A$ in Example 1 by 0.4% while the reduction in Example 2 was only 0.2%. In Example 3, tempering actually increased the $LT_A$ by 0.6% rather than decrease it as shown in Example 1. This reduced effect of solarization and tempering on $LT_A$ in Example 3 and the unexpected increase in luminous transmittance is particularly significant when compared to Example 1 because, since both compositions have nearly the same high amount of total iron and comparable redox, this effect may be attributed mainly to the presence of titanium oxide. As a result, it is clear that the combination of iron and titanium oxide can actually increase the $LT_A$, thereby allowing the maximum amount of iron to be used and improve the overall solar performance of the glass.

Table 2 also indicates that the drop in TSUV for Example 3 is greater than Example 1, with a 50% increase in the contribution due to tempering while the drop due to solarization is reduced. This reduction in TSUV is favorable since TSUV is a spectral property that the glass compositions are attempting to reduce. Again, since the iron content and redox for Examples 1 and 3 are comparable, the advantageous reduction in TSUV is principally attributable to the presence of titanium oxide in the glass.

In the present invention, titanium oxide is used to enhance the spectral properties of glass. More particularly, not only is it added to reduce TSUV in annealed glass but also to further reduce the TSUV as a result of tempering and solarization and improve the ultraviolet transmittance performance. In addition, the titanium oxide reduces the drop in $LT_A$ by inhibiting solarization and tempering and in some instances, actually improves the $LT_A$. As a result, glass compositions may be formulated with titanium oxide to provide spectral properties, and in particular $LT_A$ and TSUV, that are borderline with respect to or do not meet desired specifications, with the expectation that solarization and tempering of the glass will increase $LT_A$ and reduce TSUV so that the glass meets the specifications.

Tables 3, 4, 5 and 6 illustrate examples of other glass compositions which include high iron along with titanium oxide and their spectral properties prior to solarization and tempering. The spectral data for Tables 3 and 4 are based on laboratory melts at reference thicknesses of 0.154 inch (3.9 mm) and 0.189 inch (4.9 mm), respectively. The spectral data in Tables 5 and 6 was generated using a computer model which predicts the spectral properties of the glass based on the glass composition and redox.

TABLE 3

(at 0.154 inch thickness)

| | Ex. 4 | Ex. 5 | Ex. 6 | Ex. 7 | Ex. 8 |
|---|---|---|---|---|---|
| $Fe_2O_3$ (wt. %) | 0.807 | 0.833 | 0.830 | 0.837 | 0.808 |
| Redox | 0.260 | 0.283 | 0.270 | 0.28 | 0.285 |
| $TiO_2$ (wt. %) | 0.42 | 0.42 | 0.42 | 0.42 | 0.41 |
| $LT_A$ (%) | 72.3 | 72.6 | 71.1 | 70.9 | 71.2 |
| TSUV (%) | 37.1 | 36.2 | 36.6 | 35.9 | 36.8 |
| TSIR (%) | 24.0 | 25.2 | 21.2 | 21.6 | 21.6 |
| TSET (%) | 45.4 | 46.1 | 43.3 | 43.4 | 43.6 |

TABLE 4

(at 0.189 inch thickness)

|  | Ex. 9 | Ex. 10 | Ex. 11 | Ex. 12 | Ex. 13 |
| --- | --- | --- | --- | --- | --- |
| $Fe_2O_3$ (wt. %) | 0.729 | 0.738 | 0.764 | 0.749 | 0.718 |
| Redox | 0.255 | 0.274 | 0.251 | 0.254 | 0.265 |
| $TiO_2$ (wt. %) | 0.41 | 0.42 | 0.47 | 0.52 | 0.42 |
| $LT_A$ (%) | 70.5 | 70.7 | 69.9 | 70.3 | 70.9 |
| TSUV (%) | 34.3 | 35.4 | 33.1 | 32.2 | 35.7 |
| TSIR (%) | 21.0 | 20.6 | 20.0 | 21.3 | 20.3 |
| TSET (%) | 42.8 | 42.7 | 41.9 | 42.7 | 42.7 |

TABLE 5

(at 0.154 inch thickness)

|  | Ex. 14 | Ex. 15 | Ex. 16 | Ex. 17 | Ex. 18 |
| --- | --- | --- | --- | --- | --- |
| $Fe_2O_3$ (wt. %) | 0.910 | 0.930 | 0.845 | 0.925 | 0.807 |
| Redox | 0.268 | 0.252 | 0.265 | 0.255 | 0.262 |
| $TiO_2$ (wt. %) | 0.05 | 0.15 | 0.30 | 0.30 | 0.35 |
| $LT_A$ (%) | 70.5 | 70.7 | 71.7 | 70.6 | 72.6 |
| TSUV (%) | 36.6 | 34.7 | 36.4 | 34.0 | 37.0 |
| TSIR (%) | 20.9 | 22.0 | 23.4 | 21.8 | 25.2 |
| TSET (%) | 43.1 | 43.7 | 45.0 | 43.4 | 46.3 |

TABLE 6

(at 0.189 inch thickness)

|  | Ex. 19 | Ex. 20 | Ex. 21 | Ex. 22 | Ex. 23 |
| --- | --- | --- | --- | --- | --- |
| $Fe_2O_3$ (wt. %) | 0.700 | 0.700 | 0.690 | 0.700 | 0.650 |
| Redox | 0.268 | 0.272 | 0.265 | 0.265 | 0.280 |
| $TiO_2$ (wt. %) | 0.05 | 0.15 | 0.30 | 0.35 | 0.40 |
| $LT_A$ (%) | 71.5 | 71.2 | 71.6 | 71.3 | 71.8 |
| TSUV (%) | 37.9 | 37.1 | 35.9 | 37.1 | 36.7 |
| TSIR (%) | 22.6 | 22.1 | 23.3 | 22.9 | 23.4 |
| TSET (%) | 44.6 | 44.1 | 44.8 | 44.4 | 45.0 |

It is expected solarization and tempering will effect the glass compositions in Examples 4 through 23 in a manner similar to that shown for Example 3.

Based on the test results, it is believed that titanium oxide, in an amount up to 2.0 weight percent of the glass batch may be used to reduce ultraviolet transmittance to a desired level, and in particular to a level not to exceed 38%.

The ultraviolet transmittance herein has been reported with reference to the wavelength range 300 to 400 nanometers. Others may use the range 300 to 390 nanometers for measuring ultraviolet. The goal of a maximum ultraviolet transmittance of 38 percent for the present invention would be approximately equivalent to 31 percent if the range 300 to 390 nanometers is used. In addition, if the Rectangular Rule is used over the 300 to 390 nanometer range, the goal of the maximum ultraviolet transmittance would be approximately 34 percent.

The glass of the present invention has a distinctly green color. The color may be a matter of taste, and the specific color characteristics need not be considered critical to the present invention, but the glasses that have been made in accordance with the invention have been characterized by excitation purity greater than 1 percent, usually from 2 to 4 percent, and dominant wavelength from 495 to 535 nanometers.

In the present invention, titanium was included in the glass composition in the form of titanium oxide. It should be appreciated by those skilled in the art that titanium in forms other than $TiO_2$, e.g. an elemental form, may be used in the batch composition but it will be converted to this oxide form within the ranges disclosed herein during the batch melting and refining process.

The total solar energy transmittance (TSET) of the glass of the present invention is relatively low, thereby significantly reducing the amount of thermal energy that passes through a window glazed with the glass. Although not critical to the invention, the TSET of the glasses of the present invention are generally lower than 45 percent.

The invention has been described with reference to specific embodiments, but it should be understood that variations and modifications that are known to those of skill in the art may be resorted to within the scope of the invention as defined by the claims that follow.

We claim:

1. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron less than 0.35, and $TiO_2$ in a sufficient amount but less than 2% to produce glass exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches.

2. The glass as in claim 1 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

3. The glass as in claim 2 wherein said colorant portion is 0.65 to 0.925% total iron (expressed as $Fe_2O_3$) with the ratio of FeO/total iron between 0.251 to 0.285 and 0.15 to 0.52% $TiO_2$.

4. The glass as in claim 1 wherein said colorant is 0.8 to 0.95% total iron (expressed as $Fe_2O_3$) with a ratio of FeO/total iron between 0.24 to 0.29 and 0.05 to 0.50% $TiO_2$ at a thickness of 0.154 inches.

5. The glass of claim 4 wherein said colorant portion is 0.807 to 0.925% total iron (expressed as $Fe_2O_3$) with the ratio of FeO/total iron between 0.252 to 0.285 and 0.15 to 0.42% $TiO_2$.

6. The glass as in claim 1 wherein said colorant is greater than 0.6 up to 0.8% total iron (expressed as $Fe_2O_3$) with a ratio of FeO/total iron between 0.24 to 0.29 and 0.05 to 0.60% $TiO_2$ at a thickness of 0.189 inches.

7. The glass of claim 6 wherein said colorant portion is 0.65 to 0.764% total iron (expressed as $Fe_2O_3$) with the ratio of FeO/total iron between 0.251 to 0.280 and 0.15 to 0.52% $TiO_2$.

8. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron less than 0.35, and $TiO_2$ in a sufficient amount but less than 2% to produce glass exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches and having a dominant wavelength from 495 to 535 nanometers.

9. The glass as in claim 8 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

10. The glass as in claim 9 wherein said colorant portion is greater than 0.65 up to 0.925% total iron (expressed as $Fe_2O_3$) with the ratio of FeO/total iron between 0.251 to 0.285 and 0.15 to 0.52% $TiO_2$.

11. The glass as in claim 8 wherein the glass has an excitation purity of greater than 1 percent.

12. The glass as in claim 11 wherein the glass has an excitation purity from 2 to 4 percent.

13. A green tinted, ultraviolet absorbing, soda lime silica glass composition comprising, on a weight percent basis, 66 to 75% $SiO_2$, 10 to 20% $Na_2O$, 5 to 15%, CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron less than 0.35, and $TiO_2$ in an amount from 0.05% to less than 2% to produce glass exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches.

14. The glass as in claim 13 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

15. The glass as in claim 14 wherein said colorant portion is 0.65 to 0.925% total iron (expressed as $Fe_2O_3$) with the ratio of FeO/total iron between 0.251 and 0.285 and 0.15 to 0.52% $TiO_2$.

16. The glass as in claim 13 wherein said colorant portion is 0.8 to 0.95% total iron (expressed as $Fe_2O_3$) with the ratio of FeO/total iron between 0.24 and 0.29 and 0.05 to 0.5% $TiO_2$ at a thickness of 0.154 inches.

17. The glass as in claim 16 wherein said colorant portion is 0.807 to 0.925% total iron (expressed as $Fe_2O_3$) with the ratio of FeO/total iron between 0.252 and 0.285 and 0.15 to 0.42% $TiO_2$.

18. The glass as in claim 13 wherein said colorant portion is greater than 0.6 up to 0.8 total iron (expressed as $Fe_2O_3$) with the ratio of FeO/total iron between 0.24 and 0.29 and 0.05 to 0.60% $TiO_2$ at a thickness of 0.189 inches.

19. The glass as in claim 18 wherein said colorant portion is 0.65 to 0.764% total iron (expressed as $Fe_2O_3$) with the ratio of FeO/total iron between 0.251 and 0.280 and 0.15 to 0.52% $TiO_2$.

20. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6% total iron (expressed as $Fe_2O_3$) with a ratio of FeO/total iron from 0.275 to less than 0.35 and exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches.

21. A green tinted, ultraviolet absorbing, soda lime silica glass composition comprising, on a weight percent basis, 66 to 75% $SiO_2$, 10 to 20% $Na_2O$, 5%, to 15% CaO, 0 to 5% MgO, 0 to 5% $Al_2O_3$, 0 to 5% $K_2O$ and a colorant portion consisting essentially of $TiO_3$ in an amount from 0.05 to less than 2% and greater than 0.6 up to 0.85% total iron (expressed as $Fe_3O_3$) with a ratio of FeO/total iron less than 0.35 and exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches.

22. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron less than 0.35, and $TiO_2$ in an amount from 0.05% to less than 2% to produce glass exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches and having a dominant wavelength from 495 to 535 nanometers.

23. The glass as in claim 22 wherein said colorant portion is greater than 0.6 up to 0.95% total iron (expressed as $Fe_2O_3$) with the ratio of FeO/total iron between 0.24 and 0.29 and 0.05 to 0.60% $TiO_2$.

24. The glass as in claim 23 wherein said colorant portion is 0.65 to 0.925% total iron (expressed as $Fe_2O_3$) with the ratio of FeO/total iron between 0.251 and 0.285 and 0.15 to 0.52% $TiO_2$.

25. The glass as in claim 22 wherein the glass has an excitation purity of greater than 1 percent.

26. The glass as in claim 25 wherein the glass has an excitation purity from 2 to 4 percent.

27. A green tinted, ultraviolet absorbing, soda lime silica glass composition comprising, ion a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6% total iron (expressed as $Fe_2O_3$) with a ratio of FeO/total iron from 0.275 to less than 0.35 and exhibiting ultraviolet transmittance no greater than 38 percent (300 to 400 nanometers), a total solar energy transmittance less than 45 percent, and luminous transmittance (illuminant A) of at least 70 percent at thicknesses ranging from 0.154 to 0.189 inches and having a dominant wavelength from 495 to 535 nanometers.

28. The glass as in claim 27 wherein the glass has an excitation purity of greater than 1 percent.

29. The glass as in claim 28 wherein the glass has an excitation purity from 2 to 4 percent.

30. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6 up to 0.85% total iron (expressed as $Fe_2O_3$) with a ratio of FeO/total iron less than 0.35 and exhibiting ultraviolet transmittance no greater than 38 percent (300 to 400 nanometers), a total solar energy transmittance less than 45 percent, and luminous transmittance (illuminant A) of at least 70% at thicknesses ranging from 0.154 to 0.189 inches and having a dominant wavelength from 495 to 535 nanometers.

31. The glass as in claim 30 wherein the glass has an excitation purity of greater than 1 percent.

32. The glass as in claim 31 wherein the glass has an excitation purity from 2 to 4 percent.

33. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than or equal to 0.65% with a ratio of FeO/total iron of greater than or equal to 0.20 to less than 0.35, and $TiO_2$ in a sufficient amount but less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches.

34. The glass as in claim 33 wherein said colorant portion is 0.65 to 0.95% total iron (expressed as $Fe_2O_3$) with the ratio of FeO/total iron between 0.24 to 0.29 and 0.05 to 0.60% $TiO_2$.

35. The glass as in claim 34 wherein said colorant portion is 0.65 to 0.925% total iron (expressed as $Fe_2O_3$) with the ratio of FeO/total iron between 0.251 to 0.285 and 0.15 to 0.52% $TiO_2$.

36. The glass as in claim 33 wherein said colorant is 0.8 to 0.95% total iron (expressed as $Fe_2O_3$) with a ratio of FeO/total iron between 0.24 to 0.29 and 0.05 to 0.50% $TiO_2$ at a thickness of 0.154 inches.

37. The glass of claim 36 wherein said colorant portion is 0.807 to 0.925% total iron expressed as $Fe_2O_3$ with the ratio of FeO/total iron between 0.252 to 0.285 and 0.15 to 0.42% $TiO_2$.

38. The glass as in claim 33 wherein said colorant is 0.65 to 0.8% total iron (expressed as $Fe_2O_3$) with a ratio of FeO/total iron between 0.24 to 0.29 and 0.05 to 0.60% $TiO_2$ at a thickness of 0.189 inches.

39. The glass of claim 38 wherein said colorant portion is 0.65 to 0.764% total iron (expressed as $Fe_2O_3$) with the ratio of FeO/total iron between 0.251 to 0.280 and 0.15 to 0.52% $TiO_2$.

40. The glass of claim 33 wherein the glass exhibits a total solar energy transmittance less than 45 percent within said thickness range.

41. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than or equal to 0.65% with a ratio of FeO/total iron of greater than or equal to 0.20 to less than 0.35, and $TiO_2$ in a sufficient amount but less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches and having a dominant wavelength from 495 to 535 nanometers.

42. The glass as in claim 41 wherein said colorant portion is 0.65 to 0.95% total iron (expressed as $Fe_2O_3$) with the ratio of FeO/total iron between 0.24 to 0.29 and 0.05 to 0.60% $TiO_2$.

43. The glass as in claim 42 wherein said colorant portion is 0.65 to 0.925% total iron (expressed as $Fe_2O_3$) with the ratio of FeO/total iron between 0.251 to 0.285 and 0.15 to 0.52% $TiO_2$.

44. The glass as in claim 41 wherein the glass has an excitation purity of greater than 1 percent.

45. The glass as in claim 44 wherein the glass has an excitation purity from 2 to 4 percent.

46. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than or equal to 0.65% with a ratio of FeO/total iron of greater than or equal to 0.20 to less than 0.35, and $TiO_2$ in an amount from 0.05% to less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches.

47. The glass as in claim 46 wherein said colorant portion is 0.65 to 0.95% total iron (expressed as $Fe_2O_3$) with the ratio of FeO/total iron between 0.24 to 0.29 and 0.05 to 0.60% $TiO_2$.

48. The glass as in claim 47 wherein said colorant portion is 0.65 to 0.925% total iron (expressed as $Fe_2O_3$) with the ratio of FeO/total iron between 0.251 and 0.285 and 0.15 to 0.52% $TiO_2$.

49. The glass as in claim 46 wherein said colorant portion is 0.8 to 0.95% total iron (expressed as $Fe_2O_3$) with the ratio of FeO/total iron between 0.24 and 0.29 and 0.05 to 0.5% $TiO_2$ at a thickness of 0.154 inches.

50. The glass as in claim 49 wherein said colorant portion is 0.807 to 0.925% total iron (expressed as $Fe_2O_3$) with the ratio of FeO/total iron between 0.252 and 0.285 and 0.15 to 0.42% $TiO_2$.

51. The glass as in claim 46 wherein said colorant portion is 0.65 to 0.8 total iron (expressed as $Fe_2O_3$) with the ratio of FeO/total iron between 0.24 and 0.29 and 0.05 to 0.60% $TiO_2$ at a thickness of 0.189 inches.

52. The glass as in claim 51 wherein said colorant portion is 0.65 to 0.764% total iron (expressed as $Fe_2O_3$) with the ratio of FeO/total iron between 0.251 and 0.280 and 0.15 to 0.52% $TiO_2$.

53. The glass as in claim 46 wherein the glass exhibits a total solar energy transmittance less than 45% within said thickness range.

54. A green tinted, ultraviolet absorbing, soda lime silica glass composition comprising, on a weight percent basis, 66 to 75% $SiO_2$, 10 to 20% $Na_2O$, 5% to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than or equal to 0.65 up to 0.85% total iron (expressed as $Fe_2O_3$) with a ratio of FeO/total iron of greater than or equal to 0.20 to less than 0.35 and exhibiting ultraviolet transmittance no greater than 38 percent (300 to 400 nanometers) and luminous transmittance (illuminant A) of at least 70 percent at thicknesses ranging from 0.154 to 0.189 inches.

55. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than or equal to 0.65% with a ratio of FeO/total iron of greater than or equal to 0.20 to less than 0.35, and $TiO_2$ in an amount from 0.05% to less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches and having a dominant wavelength from 495 to 535 nanometers.

56. The glass as in claim 55 wherein said colorant portion is 0.65 to 0.95% total iron (expressed as $Fe_2O_3$) with the ratio of FeO/total iron between 0.24 and 0.29 and 0.05 to 0.60% $TiO_2$.

57. The glass as in claim 56 wherein said colorant portion is 0.65 to 0.925% total iron (expressed as $Fe_2O_3$) with the ratio of FeO/total iron between 0.251 and 0.285 and 0.15 to 0.52% $TiO_2$.

58. The glass as in claim 55 wherein the glass has an excitation purity of greater than 1 percent.

59. The glass as in claim 58 wherein the glass has an excitation purity from 2 to 4 percent.

60. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than or equal to 0.65 up to 0.85% total iron (expressed as $Fe_2O_3$) with a ratio of FeO/total iron of greater than or equal to 0.20 to less than 0.35 and exhibiting ultraviolet transmittance no greater than 38 percent (300 to 400 nanometers) and luminous transmittance (illuminant A) of at least 70% at thicknesses ranging from 0.154 to 0.189 inches and having a dominant wavelength from 495 to 535 nanometers.

61. The glass as in claim 60 wherein the glass has an excitation purity of greater than 1 percent.

62. The glass as in claim 61 wherein the glass as an excitation purity from 2 to 4 percent.

63. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron of greater than or equal to 0.24 to less than 0.35, and $TiO_2$ in a sufficient amount but less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches.

64. The glass as in claim 63 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

65. The glass as in claim 64 wherein said colorant portion is 0.65 to 0.925% total iron (expressed as $Fe_2O_3$) with the ratio of FeO/total iron between 0.251 to 0.285 and 0.15 to 0.52% $TiO_2$.

66. The glass as in claim 63 wherein said colorant is 0.8 to 0.95% total iron (expressed as $Fe_2O_3$) with a ratio of FeO/total iron between 0.24 to 0.29 and 0.05 to 0.5)% $TiO_2$ at a thickness of 0.154 inches.

67. The glass of claim 66 wherein said colorant portion is 0.807 to 0.925% total iron expressed as $Fe_2O_3$) with the ratio of FeO/total iron between 0.252 to 0.285 and 0.15 to 0.42% $TiO_2$.

68. The glass as in claim 63 wherein said colorant is greater than 0.6 up to 0.8% total iron (expressed as $Fe_2O_3$) with a ratio of FeO/total iron between 0.24 to 0.29 and 0.05 to 0.60% $TiO_2$ at a thickness of 0.189 inches.

69. The glass of claim 68 wherein said colorant portion is 0.65 to 0.764% total iron (expressed as $Fe_2O_3$) with the ratio of FeO/total iron between 0.251 to 0.280 and 0.15 to 0.52% $TiO_2$.

70. The glass of 63 wherein the glass exhibits a total solar energy transmittance less than 45 percent within said thickness range.

71. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron of greater than or equal to 0.24 to less than 0.35, and $TiO_2$ in a sufficient amount but less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches and having a dominant wavelength from 495 to 535 nanometers.

72. The glass as in claim 71 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

73. The glass as in claim 72 wherein said colorant portion is greater than 0.65 up to 0.925% total iron (expressed as $Fe_2O_3$) with the ratio of FeO/total iron between 0.251 to 0.285 and 0.15 to 0.52% $TiO_2$.

74. The glass as in claim 71 wherein the glass has an excitation purity of greater than 1 percent.

75. The glass as in claim 74 wherein the glass has an excitation purity from 2 to 4 percent.

76. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron of greater than or equal to 0.24 to less than 0.35, and $TiO_2$ in an amount from 0.05% to less than 2% to produce glass exhibiting ultraviolet transmittance no greater than 38 percent (300 to 400 nanometers) and luminous transmittance (illuminant A) of at least 70 percent at thicknesses ranging from 0.154 to 0.189 inches.

77. The glass as in claim 76 wherein said colorant portion is greater than 0.6 up to 0.95% total iron (expressed as $Fe_2O_3$) with the ratio of FeO/total iron between 0.24 to 0.29 and 0.05 to 0.60% $TiO_2$.

78. The glass as in claim 77 wherein said colorant portion is 0.65 to 0.925% total iron (expressed as $Fe_2O_3$) with the ratio of FeO/total iron between 0.251 and 0.285 and 0.15 to 0.52% $TiO_2$.

79. The glass as in claim 76 wherein said colorant portion is 0.8 to 0.95% total iron (expressed as $Fe_2O_3$) with the ratio of FeO/total iron between 0.24 and 0.29 and 0.05 to 0.5% $TiO_2$ at a thickness of 0.154 inches.

80. The glass as in claim 79 wherein said colorant portion is 0.807 to 0.925% total iron (expressed as $Fe_2O_3$) with the ratio of FeO/total iron between 0.252 and 0.285 and 0.15 to 0.42% $TiO_2$.

81. The glass as in claim 76 wherein said colorant portion is greater than 0.6 up to 0.8 total iron (expressed as $Fe_2O_3$) with the ratio of FeO/total iron between 0.24 and 0.29 and 0.05 to 0.60% $TiO_2$ at a thickness of 0.189 inches.

82. The glass as in claim 81 wherein said colorant portion is 0.65 to 0.764% total iron (expressed as $Fe_2O_3$) with the ratio of FeO/total iron between 0.251 and 0.280 and 0.15 to 0.52% $TiO_2$.

83. The glass as in claim 76 wherein the glass exhibits a total solar energy transmittance less than 45% within said thickness range.

84. A green tinted, ultraviolet absorbing, soda lime silica glass composition comprising, on a weight percent basis, 66 to 75% $SiO_2$, 10 to 20% $Na_2O$, 5% to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6 up to 0.85% total iron (expressed as $Fe_2O_3$) with a ratio of FeO/total iron of greater than or equal to 0.24 to less than 0.35 and exhibiting ultraviolet transmittance no greater than 38 percent (300 to 400 nanometers) and luminous transmittance (illuminant A) of at least 70 percent at thicknesses ranging from 0.154 to 0.189 inches.

85. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of total iron (expressed as $Fe_2O_3$) in an amount greater than 0.6% with a ratio of FeO/total iron of greater than or equal to 0.24 to less than 0.35, and $TiO_2$ in an amount from 0.05% to less than 2% to produce glass exhibiting ultraviolet transmittance (illuminant A) of at least 70 percent at thicknesses ranging from 0.154 to 0.189 inches and having a dominant wavelength from 495 to 535 nanometers.

86. The glass as in claim 85 wherein said colorant portion is greater than 0.6 up to 0.95% total iron (expressed as $Fe_2O_3$) with the ratio of FeO/total iron between 0.24 and 0.29 and 0.05 to 0.60% $TiO_2$.

87. The glass as in claim 86 wherein said colorant portion is 0.65 to 0.925% total iron (expressed as $Fe_2O_3$) with the ratio of FeO/total iron between 0.251 and 0.285 and 0.15 to 0.52% $TiO_2$.

88. The glass as in claim 85 wherein the glass has an excitation purity of greater than 1 percent.

89. The glass as in claim 88 wherein the glass has an excitation purity from 2 to 4 percent.

90. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6 up to 0.85% total iron (expressed as $Fe_2O_3$) with a ratio of FeO/total iron of greater than or equal to 0.24 to less than 0.35 and exhibiting ultraviolet transmittance no greater than 38 percent (300 to 400 nanometers) and luminous transmittance (illuminant) of at least 70% at thicknesses ranging from 0.154 to 0.189 inches and having a dominant wavelength from 495 to 535 nanometers.

91. The glass as in claim 90 wherein the glass has an excitation purity of greater than 1 percent.

92. The glass as in claim 91 wherein the glass has an excitation purity from 2 to 4 percent.

93. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6% total iron (expressed as $Fe_2O_3$) with a ratio of FeO/total iron from 0.275 to less than 0.35 and exhibiting ultraviolet transmittance no greater than 38 percent (300 to 400 nanometers) and luminous transmittance (illuminant A) of at least 70 percent at thicknesses ranging from 0.154 to 0.189 inches.

94. A green tinted, ultraviolet absorbing, soda lime silica glass composition comprising, on a weight percent basis, 66 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of $TiO_2$ in an amount from 0.05 to less than 2% and greater than 0.6% total iron (expressed as $Fe_2O_3$) with a ratio of FeO/total iron from 0.275 to less than 0.35 and exhibiting ultraviolet transmittance no greater than 38 percent (300 to 400 nanometers) and luminous transmittance (illuminant A) of at least 70 percent at thicknesses ranging from 0.154 to 0.189 inches and having a dominant wavelength from 495 to 535 nanometers.

95. The glass as in claim 94 wherein the glass has an excitation purity of greater than 1 percent.

96. The glass as in claim 95 wherein the glass has an excitation purity from 2 to 4 percent.

97. A method of producing green tinted, ultraviolet absorbing glass exhibiting ultraviolet transmittance no greater than 38 percent (300 to 400 nanometers) and luminous transmittance (illuminant A) of at least 70 percent at thicknesses ranging from 0.154 to 0.189 inches, comprising:

melting and forming soda lime silica glass having a composition comprising, on a weight percent basis, 65 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of less than 2.0% $TiO_2$ and greater than 0.6% total iron (expressed as $Fe_2O_3$) with the ratio of FeO/total iron less than 0.35, said glass having a luminous transmittance less than 70 percent; and tempering said glass to increase said luminous transmittance to a value greater than 70 percent.

98. The method as in claim 97 herein said melting and forming step produces glass having ultraviolet transmittance greater than 38 percent and said tempering step reduces said ultraviolet transmittance to a value no greater than 38 percent.

99. The method of claim 97 wherein said ultraviolet transmittance is no greater than 38 percent and said luminous transmittance is at least 70 percent at a reference thickness of 0.154 inches and said colorant portion is 0.8 to 0.95% total iron (expressed as $Fe_2O_3$) with the ratio of FeO/total iron between 0.24 to 0.29 and 0.05 to 0.50% $TiO_2$.

100. The method of claim 99 wherein said colorant portion is 0.807 to 0.925% total iron (expressed as $Fe_2O_3$) with the ratio of FeO/total iron between 0.252 to 0.285 and 0.15 to 0.42% TiO2.

101. The method of claim 98 wherein said ultraviolet transmittance is no greater than 38 percent and said luminous transmittance is at least 70 percent at a reference thickness of 0.189 inches and said colorant portion is 0.6 to 0.8% total iron (expressed as $Fe_2O_3$) with the ratio of FeO/total iron between 0.24 to 0.29 and 0.05 to 0.60% $TiO_2$.

102. The method of claim 101 wherein said colorant portion is 0.650 to 0.764% total iron (expressed as $Fe_2O_3$) with the ratio of FeO/total iron between 0.251 to 0.280 and 0.15 to 0.52% TiO2.

103. The method of claim 99 wherein said colorant is greater than 0.6 up to 0.95% total iron (expressed as $Fe_2O_3$) with the ratio of FeO/total iron between 0.24 to 0.29 and 0.05 to 0.60% $TiO_2$.

104. The method of claim 103 wherein said colorant is 0.65 to 0.925% total iron (expressed as $Fe_2O_3$) with the ratio of FeO/total iron between 0.251 to 0.285 and 0.15 to 0.52% $TiO_2$.

105. A method of producing green tinted, ultraviolet absorbing glass exhibiting ultraviolet transmittance no greater than 38 percent (300 to 400 nanometers) and luminous transmittance (illuminant A) of at least 70 percent at thicknesses ranging from 0.154 to 0.189 inches and having a dominant wavelength of 495 to 535 nanometers, comprising:

melting and forming soda lime silica glass having a composition comprising, on a weight percent basis, 65 to 75% $SiO_2$, 10 to 20% $Na_2O$, 5 to 15% CaO, 0 to 5% MgO, 0 to 5% $Al_2O_3$, 0 to 5% $K_2O$ and a colorant portion consisting essentially of less than 2.0% $TiO_2$ and greater than 0.6% total iron (expressed as $Fe_2O_3$) with the ratio of FeO/total iron less than 0.35, said glass having a luminous transmittance less than 70 percent; and tempering said glass to increase said luminous transmittance to a value greater than 70 percent.

106. The method as in claim 105 wherein said colorant is greater than 0.6 up to 0.95% total iron (expressed as $Fe_2O_3$) with the ratio of FeO/total iron between 0.24 to 0.29 and 0.05 to 0.60% $TiO_2$.

107. The method as in claim 106 wherein said colorant is 0.65 to 0.925% total iron (expressed as $Fe_2O_3$) with the ratio of FeO/total iron between 0.251 to 0.285 and 0.15 to 0.52% $TiO_2$.

108. The method as in claim 105 wherein the glass has an excitation purity of greater than 1 percent.

109. The method as in claim 108 wherein the glass has an excitation purity from 2 to 4 percent.

* * * * *